United States Patent

Biggs

[15] 3,673,556

[45] June 27, 1972

[54] TWO-LEVEL DEPTH CONTROLLERS FOR SEISMIC STREAMER CABLES

[72] Inventor: Paul G. Biggs, Houston, Tex.

[73] Assignee: Western Geophysical Company of America, Houston, Tex.

[22] Filed: July 15, 1970

[21] Appl. No.: 55,038

[52] U.S. Cl. .......................... 340/7 PG, 114/235 B, 340/7 R
[51] Int. Cl. ................... B63b 21/56, G01v 1/16, H01b 7/12
[58] Field of Search ............. 340/7 PC; 43/43.13; 114/235 B; 73/406

[56] References Cited

UNITED STATES PATENTS

| | | | |
|---|---|---|---|
| 2,928,367 | 3/1960 | McCormick | 114/235 B |
| 3,531,762 | 9/1970 | Tickell | 340/7 PC |
| 3,412,704 | 11/1968 | Buller et al. | 114/235 B |
| 3,434,446 | 3/1969 | Cole | 114/235 B |
| 3,541,989 | 11/1970 | Leonard | 114/235 B |

*Primary Examiner*—Benjamin A. Borchelt
*Assistant Examiner*—H. A. Birmiel
*Attorney*—Michael P. Breston, Alan C. Rose, Walter R. Thiel and Alfred B. Levine

[57] ABSTRACT

This invention relates to controllers for seismic streamer cables for controlling the depth of the streamer cable while it is towed through a body of water. The controller is adapted to maintain the streamer cable at one predetermined level, and upon receipt of a remote-control signal the controller moves the cable to another predetermined level.

11 Claims, 6 Drawing Figures

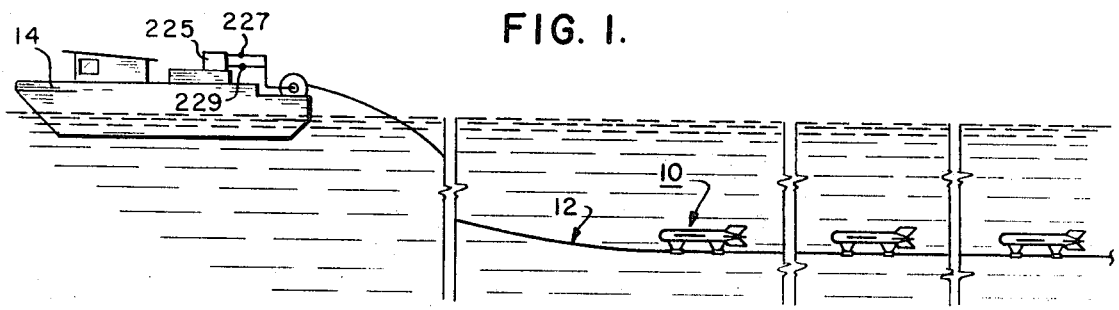
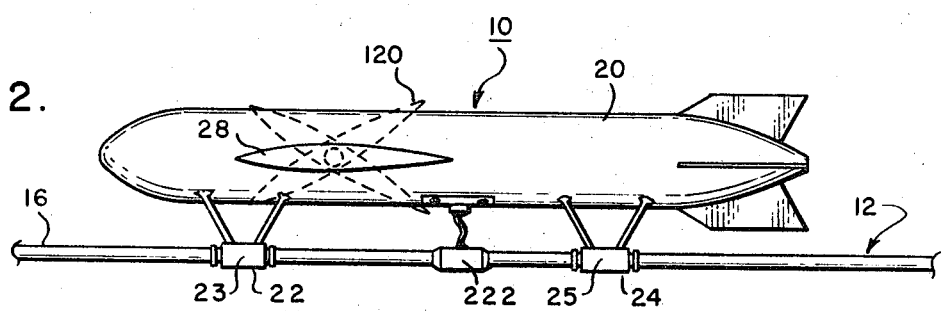
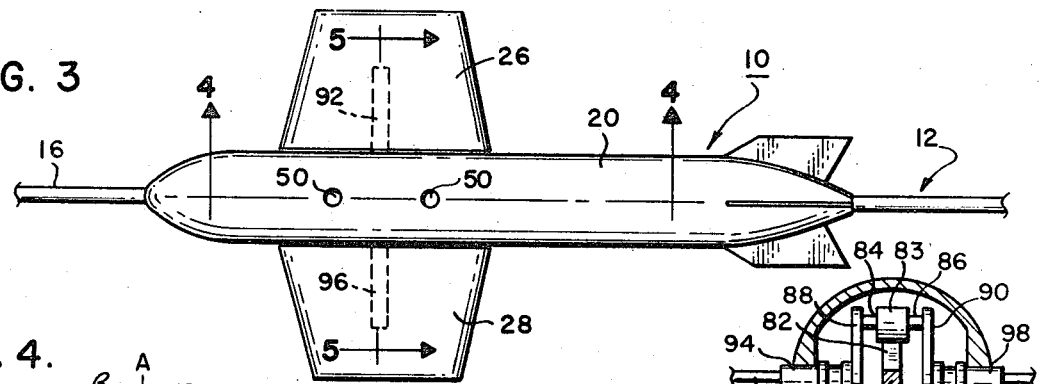
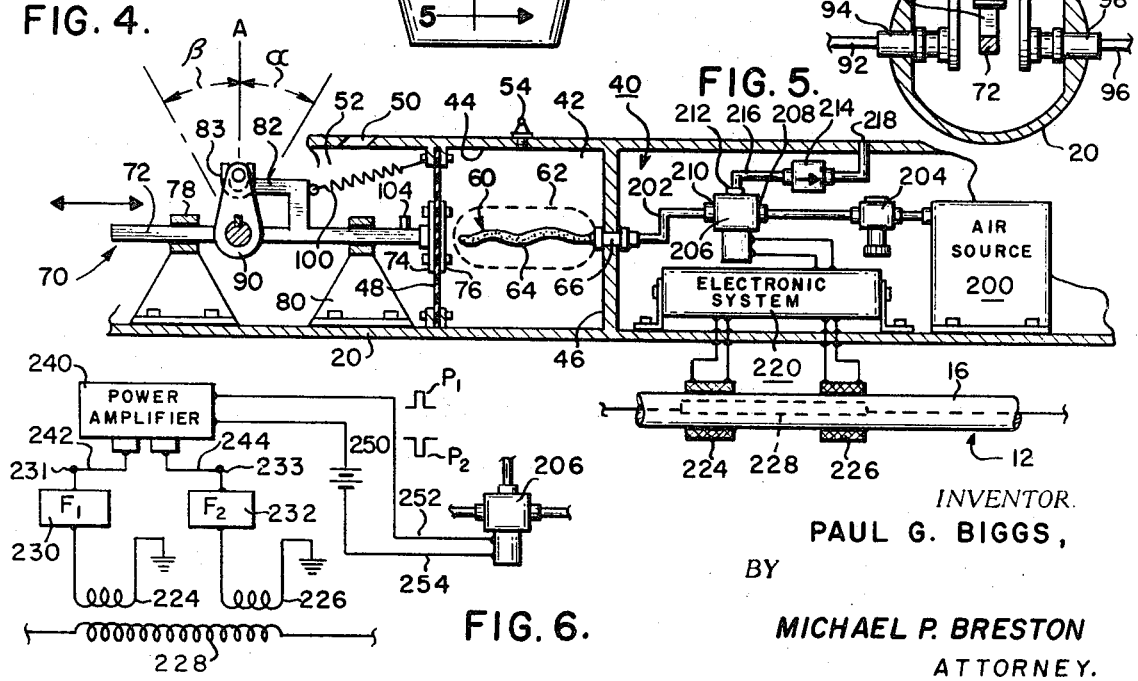

TWO-LEVEL DEPTH CONTROLLERS FOR SEISMIC STREAMER CABLES

BACKGROUND OF THE INVENTION

The art of marine seismic exploration has in the recent past progressed to deeper and deeper ocean waters. In conducting marine seismic surveying operations it is the practice to tow a streamer cable and to maintain it at a predetermined depth level. The need often arises for two operating levels. For example, a streamer cable may be towed at a depth of 40 feet during one phase of seismic exploration, and subsequently it is desired to tow it at a depth of 60 feet, and vice versa. To accomplish such a depth variation, present day practice requires the reeling in of the cable, the removal of the depth controllers mounted thereon, the readjustment of the depth-control means inside the controllers, and the reeling out of the streamer cable. Such a procedure is extremely wasteful of exploration time.

More recently seismic cable depth controllers have been proposed which are intended to allow the continuous variation of the depth at which the controllers operate. However, such depth controllers were found to be rather complicated to manufacture and not completely dependable in operation.

SUMMARY OF THE INVENTION

The present invention contemplates broadly new and improved depth controllers for controlling the depth of operation of a streamer cable between two predetermined depth levels.

An illustrated embodiment comprises a frame coupled to the seismic cable. A pair of movable, laterally extending surfaces are symmetrically attached to the frame. The surfaces move from a maximum descending angular position to a maximum ascending angular position. In accordance with this invention, an inflatable member is positioned inside a fluid chamber to vary the pressure thereof. Remote control means are provided to automatically inflate and deflate the flexible member to thereby change the cable's depth from one predetermined depth to the other.

BRIEF DESCRIPTION OF THE DRAWINGS

FIG. 1 shows schematically a towed streamer cable maintained by the depth controllers at a predetermined depth;

FIG. 2 is a view in perspective of a single controller of FIG. 1;

FIG. 3 is a top view of the controller shown in FIG. 2;

FIG. 4 is a sectional view of the controller taken in FIG. 3 along line 4—4;

FIG. 5 is a sectional view of the movable wing control means taken in FIG. 3 on line 5—5; and FIG. 6 is a block-diagram representation of the electronic remote-control means.

Referring to the drawings, a plurality of depth controllers, generally designated as 10, are attached to a streamer cable 12 which is towed by a seismic boat 14. Streamer cable 12 houses arrays of detectors (not shown) for receiving the reflected seismic signals and transmitting them to recording equipment on the deck of seismic boat 14.

The construction of seismic streamer cables is well known in the art and accordingly no detailed description thereof will be given herein. Seismic streamer cables per se are described, for example, in U.S. Pat. Nos. 2,465,696 and 3,299,397. Typically, a streamer cable 12 is made of an outer flexible tubular housing or jacket 16 containing arrays of hydrophones, reinforcing rods, pressure gauges, and other like transducers (not shown) and is filled with a suitable fluid.

Each depth controller 10 has a streamlined frame 20 which is coupled to cable 12 at spaced locations 22 and 24 by clamps 23 and 25. Frame 20 is made of a suitable rigid, non-corrosive material such as stainless steel, plastic, etc. Extending outwardly and laterally from frame 20 are a pair of movable control surfaces or wings 26 and 28. Wings 26 and 28 can rotate in unison in response to a remote-control signal transmitted from vessel 14, or in response to a depth variation from a predetermined depth level.

Inside frame 20 is a depth-control system generally designated as 40. It includes an air chamber 42 defined by a cylindrical inner wall 44, a rigid end wall 46, and an opposite flexible end wall of diaphragm 48. A plurality of ports 50 admit external water pressure into a chamber 52 facing diaphragm 48. Air is admitted inside air chamber 42 by an air valve 54 which may be a standard tire valve.

To translate the linear displacement of diaphragm 48, in response to a pressure difference across its walls, into a shaft rotation, there is provided a translating mechanism, generally designated as 70 which includes a rod 72, one end of which is secured to the center of diaphragm 48 by two opposite plates 74, 76. Rod 72 is slidably supported by two support members 78 and 80 secured to frame 20. An L-shaped bracket 82 extends upwardly from rod 72. The free end 83 of bracket 82 has a bore 84 for rotatably accepting a stub shaft 86 and ends of which are fixedly secured to two pivot arms 88 and 90. Pivot arm 88 is keyed to the wing shaft 92 rotatably mounted inside a bushing 94, and pivot arm 90 is keyed to the wing shaft 96 rotatably mounted inside a bushing 98.

The symmetrical arrangement of the parts and the axial lateral alignment of shafts 92 and 96 is evidenced from the drawings.

Wings 26 and 28 are fixedly secured to the shafts 92 and 96, respectively, and have a horizontal attitude under balanced conditions in the water at the predetermined depth level.

A spring 100, having one end attached to bracket 82 and the other end to the frame 20 rotates wings 26 and 28 clockwise, as viewed in FIG. 4 by a maximum allowed angle $\alpha$ relative to a transverse plane A. When air pressure is applied to the air chamber 42 it exerts an outward force against diaphragm 48 thereby tending to push rod 72 outwardly. An adjustable limit stop 104 mounted on rod 72 allows the rotation of shafts 92 and 96 by a maximum counterclockwise angle $\beta$ with respect to the transverse plane A passing through the shafts' axes.

In operation of the depth controller 10 thus far described, before each controller 10 is coupled to the streamer cable 12, the air pressure in chamber 42 is adjusted for one desired operating depth level, hereinafter for illustrative purposes specified as 40 feet. Acting on diaphragm 48 are essentially three forces: the outward force resulting from the air pressure being exerted on the inner wall of the diaphragm, the inward force exerted by the spring 100 and the inward force exerted by the water pressure against the outer wall of the diaphragm. At equilibrium, that is at the desired depth level of 40 feet, the sum of the forces due to the water pressure and to the spring is equal to the force due to the air pressure. Before each controller 10 is waterborne, the force due to the air pressure is greater than the force due to the spring 100 thereby causing rod 72 to move outwardly. This motion is limited by the stop member 104. The wings 26 and 28 then assume a maximum descending attitude as shown by the dotted lines 120.

As soon as each controller becomes waterborne, a hydrodynamic force becomes developed in each of wings 26 and 28 as a result of the forward velocity of cable 12. This hydrodynamic force varies with the angle of attack of the wings $\beta$, which is limited for example to an angle not to excede 15° from the vertical plane A. The vertical component of this hydrodynamic force causes the depth controller to drive until it reaches a level wherein an equilibrium condition exists between the forces produced by the air pressure, by the spring, and by the water pressure. At equilibrium the wings assume a horizontal attitude with respect to the free level of the water surface.

If cable 12 falls below this predetermined level of 40 feet, the water pressure will cause diaphragm 48 to move inwardly and hence wings 26 and 28 will rotate clockwise, as viewed in FIG. 4, until the predetermined level is reestablished. If cable 12 rises above this predetermined level, then the wings will move counterclockwise.

As thus far described the construction and the operation of the depth controller 10 is conventional.

In accordance with this invention there is also positioned inside air chamber 42 an extensible bladder 60 which can be inflated to a volume, depicted by dotted line 62, from a deflated volume depicted by line 64. Bladder 60 may be made of a stretchable material such as rubber and is inflated and deflated through an air tube 66 extending through the end wall 46. The air pressure inside chamber 42 can be increased from its predetermined pressure corresponding to a depth level of 40 feet by expanding the volume of bladder 60. Conversely, the air pressure inside chamber 42 can be decreased from its predetermined pressure corresponding to a depth level of 60 feet by contracting the volume of bladder 60. The expansions and contractions of bladder 60 are accomplished by an electro-mechanical system 40 which includes a high-pressure air source 200 in fluid communication with the air tube 66 through a line 202. In line 202 are a pressure regulator 204 and a solenoid-operated valve 206. The function of regulator 204 is to regulate the amount of air flowing through line 202 and to thereby control the pressure inside bladder 60. When the desired pressure inside bladder 60 is reached, regulator 204 will stop the air flow between source 200 and bladder 60. The solenoid-operated valve 206 is a commercially available three-way valve which allows air to flow between an inlet port 208 and an outlet port 210. Outlet port 210 fluidly communicates with tube 66. Ports 210 can also fluidly communicate with an exhaust port 212. A line 216 including a a check valve 214 couples the exhaust port 212 to an air outlet port 218 surrounded by the ambient water pressure. Such a three-way valve can be purchased, for example, from the Skinner Valve Division, New Britain, Connecticut.

To remotely control and operate the electro-mechanical system 40, there is provided an electronic system, generally designated as 220. System 220 includes a coupler 222 coupled around the flexible outer jacket 16 of streamer cable 10. Coupler 222 includes two secondary windings 224 and 226 positioned adjacent and opposite to a primary winding 228 housed inside jacket 16. For each controller 10 there is provided a primary winding 228 and a pair of secondary windings 224 and 226. All of the primary windings 228 throughout the entire length of cable 12 are connected in series-circuit relationship to the output terminals 227 and 229 of variable-frequency signal generator 225 located on the deck of boat 14.

A tuned circuit 230 is coupled to the secondary winding 224 and another tuned circuit 232 is coupled to the other secondary winding 226. Tuned circuit 230 provides a pulse to its output terminal 231 when the frequency of the signal transmitted by source 225 through the primary windings 228 has a frequency $F_1$. Tuned circuit 232 provides a pulse to its output terminal 233 when the signal transmitted by source 225 through the primary windings 228 has a frequency $F_2$. The pulses are amplified by a power amplifier 240 having two input terminals 242 and 244 connected to the output terminals 231 and 233, respectively. Amplifier 240 provides a positive high-energy pulse $P_1$ to the solenoid-operated valve 206 in response to the $F_1$ signal transmitted by source 225, and provides a negative pulse $P_2$ in response to the $F_2$ signal transmitted by source 225. A local DC voltage source, such as a battery 250, provides the necessary energizing power to the electronic system 220 as well as to the solenoid-operated valve 206. The opposite polarity pulses $P_1$ and $P_2$ are applied on wires 252 and 254 to the input of the solenoid-operated valve 206.

In operation, initially ports 210 and 212 are in fluid communication and the check valve 214 prevents outside water from entering port 212. Each depth controller 10 is operating at its first predetermined depth level of 40 feet and the bladder 60 is completely deflated.

When it is desired to cause each depth controller 10 to move to the second predetermined level of 60 feet, transmitter 225 transmits a signal having a frequency $F_1$, say 5 kilocycles. Signal $F_1$ passing through each of the primary windings 228 induces a signal in each of the secondary windings 224 and 226. Only tuned circuit 230 will provide an appreciable output pulse to its output terminal 231 which will be amplified by the power amplifier 240 into a positive power pulse $P_1$ applied to the solenoid of valve 206.

Valve 206 will then break fluid communication between ports 210 and 212 and establish fluid communication between ports 208 and 210. As previously mentioned, regulator 204 has been preset to allow the high-pressure source 200 to inflate bladder 60 to a volume 62 and to thereby uniformly increase the pressure inside chamber 42 to that corresponding to a depth level of 60 feet. As soon as the pressure inside chamber 42 starts increasing, wings 26 and 28 rotate counter-clockwise (as viewed in FIG. 4). When the depth controller 10 reaches the second predetermined depth level of 60 feet, an equilibrium condition will be reestablished between the sum of the forces exerted by the ambient water pressure and the spring 100 on one hand, and the air pressure inside chamber 42 on the other hand.

When it is desired for the depth controller 10 to return from the second predetermined level of 60 feet to the first predetermined level of 40 feet, signal generator 225 transmits a signal having a frequency $F_2$, say 8 kilocycles, through the primary windings 228. Only tuned circuit 232 will now provide an output pulse to its output terminal 233 which will be amplified by the power amplifier 240 into the negative power pulse $P_2$. This negative pulse $P_2$ will cause the solenoid-operated valve 206 to break fluid communication between ports 208 and 210 and to reestablish fluid communication between ports 210 and 212.

Due to the force exerted by the spring 100, it will be apparent that the pressure inside chamber 42 is greater than the ambient water pressure facing outlet 218. Accordingly, the check valve 214 will allow the air pressure inside bladder 60 to escape in the direction of the arrow shown on the check valve 214. Bladder 60 will completely deflate to its minimum volume represented by line 64. Check valve 214 prevents water from entering the solenoid-operated valve 206. As soon as the air from bladder 60 starts to exhaust, wings 26 and 28 start to rotate clockwise, as viewed in FIG. 4. When the depth controller 10 reaches again the first predetermined level of 40 feet, its wings will again assume a horizontal attitude relative to the water surface.

In sum, by inflating bladder 60, depth controller 10 is caused to move downwardly from its first predetermined level of 40 feet until it reaches its second predetermined level of 60 feet. Conversely, by deflating bladder 60 the depth controller 10 is caused to move upwardly from the second level until it reaches its first level. The amount of air pressure inside source 200 can be adjusted to allow for a sufficient number, say twenty, up-and-down manipulations of the depth controller 10.

While this invention has been described with reference to specific embodiments, it will be apparent that the invention is not limited thereto and modifications will readily suggest themselves to those skilled in the art without departing from the scope of the claims attached hereto.

What I claim is:

1. In a controller for controlling the depth of a body between a first predetermined depth level and a second predetermined level while it is being towed below the free surface of a water medium, the controller having a frame removably coupled to said body and including: depth-sensing means responsive to the water's pressure and defining a chamber having a movable wall for containing a gas whose pressure is adjusted for a predetermined depth level, a pair of rotatable surfaces symmetrically disposed relative to the longitudinal axis of said frame and laterally extending therefrom, and torque-producing means coupling said surfaces to said movable wall to rotate said surfaces by an amount and in a direction dependent on said body's depth variation from said predetermined depth level, the improvement comprising:

a source of high-pressure gas in said frame;
an inflatable member in said chamber, said member when said controller is in use being inflated by said source or deflated by exhausting the gas from said member into the surrounding water; and gas-conduit means including electrically controllable valve means coupling said source with said member and with said surrounding water to selectively maintain said member deflated or inflated, thereby allowing said controller to selectively maintain said body at said first predetermined level and upon actuation of said valve means to move said body to said second predetermined level.

2. The controller of claim 1 wherein said inflatable member is made of a stretchable material.

3. The controller of claim 1 wherein said gas-conduit means are adapted to provide a first path for the flow of gas from said source to said inflatable member, and a second path for the flow of gas from said member to the water surrounding said frame.

4. The controller of claim 3 and further including,
electronic means electrically connected to said valve means, said electronic means being responsive to control signals transmitted through said towed body.

5. The controller of claim 4 wherein said body is a long seismic streamer cable.

6. The controller of claim 5 wherein said first flow path includes a pressure regulator to allow said inflatable member to become inflated to a predetermined pressure corresponding to said first predetermined depth level.

7. The controller of claim 6 wherein said second flow path includes a unidirectional valve to prevent water from entering said inflatable member.

8. The controller of claim 7 wherein,
said electrically controllable valve means is a solenoid operated valve, and
said electronic means includes a first frequency-selective network responsive to a first control signal having a first frequency range.

9. The controller of claim 8 wherein,
said electronic means includes a second frequency-selective network responsive to a second control signal having a second frequency range.

10. The controller of claim 9 wherein,
said streamer cable includes at least one inner primary winding for receiving said control signals,
said electronic means include a first secondary winding and a second secondary winding,
said first secondary winding being connected to said first frequency-selective network, and
said second secondary winding being connected to said second frequency-selective network.

11. The controller of claim 10 wherein,
said seismic streamer cable is towed by a seismic vessel and further including:
transmitter means on said vessel connected to said primary winding for generating said control signals.

* * * * *